(12) United States Patent
Ono (10) Patent No.: US 6,741,082 B2
(45) Date of Patent: May 25, 2004

(54) DISTANCE INFORMATION OBTAINING APPARATUS AND DISTANCE INFORMATION OBTAINING METHOD

(75) Inventor: Shuji Ono, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 203 days.

(21) Appl. No.: 09/962,443

(22) Filed: Sep. 26, 2001

(65) Prior Publication Data

US 2002/0040971 A1 Apr. 11, 2002

(30) Foreign Application Priority Data

Sep. 26, 2000 (JP) ......................................... 2000-291623

(51) Int. Cl.$^7$ .............................. G01B 11/14; G01C 3/00
(52) U.S. Cl. ................................. 324/559.38; 356/3.09
(58) Field of Search ......................... 250/559.38; 356/3, 356/3.09, 4.01

(56) References Cited

U.S. PATENT DOCUMENTS 6,204,755 B1 * 3/2001 Kikuchi ................. 250/559.38

FOREIGN PATENT DOCUMENTS

| JP | 61-155909 | 7/1986 |
|---|---|---|
| JP | 62-46207 | 2/1987 |
| JP | 63-233312 | 9/1988 |

\* cited by examiner

*Primary Examiner*—Walter E. Snow
(74) *Attorney, Agent, or Firm*—Birch, Stewart, Kolasch & Birch, LLP (57) ABSTRACT

A distance information obtaining apparatus for obtaining information of a distance from a measurement-start point to an object, includes: a light beam emitting unit for emitting a light beam; a light beam scanning unit for scanning the object with the light beam in such a manner that a center of scan is positioned on the measurement-start point; a reflected light detecting unit for detecting reflected light from a point-of-interest on the object scanned with said light beam; a distance information calculating unit for calculating the distance from a scan velocity and a parameter related to an irradiation time of the object; and an information outputting unit for outputting the calculated distance.

20 Claims, 12 Drawing Sheets

DISTANCE INFORMATION OBTAINING APPARATUS AND DISTANCE INFORMATION OBTAINING METHOD

This patent application claims a priority based on a Japanese patent application, 2000-291623 filed on Sep. 26, 2000, the contents of which are incorporated herein by reference.

BACKGROUND OF THE INVENTION

1. Field of the Invention

The present invention relates to a distance information obtaining apparatus and a distance information obtaining method for obtaining information regarding a distance to an object. More particularly, the present invention relates to a distance information obtaining apparatus and a distance information obtaining method for obtaining the information of the distance to the object by detecting reflected light from the object irradiated with light.

2. Description of the Related Art

As a distance information obtaining method for obtaining a distance from a predetermined point to an object, a plurality of methods are proposed in which light is cast onto an object and the light reflected from the object is received so as to calculate the distance. These methods are generally classified into two groups, i.e., method based on triangulation and other methods.

In the methods based on the triangulation, a pattern of light is cast onto the object. From the position of the pattern of light, three-dimensional positional information is obtained based on the principle of the triangulation. In addition, there are a plurality of methods proposed other than the above, including a light cutting method, a grating projection method, a coded grading projection method, a colored grating projection method and Moire method. These methods are also based on the triangulation.

The methods that are not based on the triangulation include a time measuring method, a phase-difference measuring method, a method in which the distance to the object is calculated by using the distance between illumination light sources, and the like.

In the time measuring method, an ultra-short light pulse is emitted toward the object. The distance to the object is obtained by measuring the time until the reflected light is returned from the object.

In the phase-difference measuring method, light rapidly modulated is cast onto the object. The distance to the object is obtained by measuring a phase change when the reflected light is returned from the object.

As the method using the positional difference between the illumination light sources, exemplary methods are disclosed Japanese Patent Applications Laying-Open Nos. 61-155909, 62-46207 and 63-233312.

In the triangulation, it is necessary on its principle that a light-emitting position at which the light is emitted is away from a reflected-light receiving position at which the reflected light from the object is received. Thus, in a case of using a capturing device for use in a very narrow space, such as an endoscope, or a case where the object can be viewed only from limited positions, for example, excavation of ruins, offshore prospecting or researches by means of a planet landing research vessel, it is difficult to obtain the distance by the triangulation.

In addition, in the time measuring method, the speed of the light is very high. Thus, in order to improve resolution, it is necessary to provide an ultra-high speed optical device and electronics, increasing the cost of a measuring apparatus.

Moreover, in the method using the distance between the positions of the illumination light sources, the illumination light sources should be arranged away from each other. Thus, the size reduction of the measuring apparatus including the illumination light sources is difficult. Furthermore, since the positions of the illumination light sources are different from each other, an angle formed between a light ray and a surface of the object is varied in accordance with the position of the illumination light source. Thus, a measurement error is likely to occur.

SUMMARY OF THE INVENTION

Therefore, it is an object of the present invention to provide a distance information obtaining apparatus and a distance information obtaining method, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a distance information obtaining apparatus for obtaining information of a distance from a measurement-start point to an object, comprises: a light beam emitting unit operable to emit a light beam; a light beam scanning unit operable to scan the object with the light beam in such a manner that a center of scan is positioned on the measurement-start point; a reflected light detecting unit operable to detect reflected light from a point-of-interest on the object scanned with the light beam; a distance information calculating unit operable to calculate the distance from a scan velocity and a parameter related to an irradiation time of the object; and an information outputting unit operable to output the calculated distance.

The parameter may be based on a time from start to end of irradiation of the object with the light beam.

The light emitting unit may emit a plurality of light beams including at least a first light beam and a second light beam, the plurality of light beams traveling in directions approximately parallel to each other; and the distance information calculating unit may calculate, as the parameter, a time from detection of the reflected light of the first light beam to detection of the reflected light of the second light beam.

The distance information obtaining unit may calculate an integrated intensity of the reflected light at the point-of-interest as the parameter, and calculates the distance by using the integrated intensity thus calculated and a maximum intensity of the reflected light.

The light beam emitting unit may emit a fan-like light beam which diverges in a direction perpendicular to a scan direction, the fan-like light beam having a predetermined cross-sectional intensity distribution in the scan direction; the reflected light detecting unit may detect the reflected light from a region on the object, the region being scanned with the fan-like light beam; and the distance information calculating unit may calculate the distance at the point-of-interest within the region.

The light beam emitted by the light beam emitting unit may have a cross-sectional intensity distribution that is Gaussian distribution; and the distance information calculating unit may calculate the integrated intensity and the maximum intensity of the reflected light at the point-of-interest based on an integrated intensity and a maximum intensity of the light beam with which the point-of-interest is irradiated.

The light beam scanning unit may scan a plane perpendicular to a straight line passing through the measurement-start point and the point-of-interest at an approximately constant velocity.

The reflected light detecting unit may be provided on an optical axis of the light beam.

The reflected light unit may include a plurality of optical sensors operable to detect the reflected light from a plurality of points-of-interest; and the distance information obtaining unit may calculate, for each of the points-of-interest, the parameter for the reflected light detected by each of the plurality of optical sensors, and calculates the distance based on the parameter.

The distance information obtaining apparatus may further comprises a diffractive grating which diffracts the light beam emitting from the light beam emitting unit into a plurality of diffractive light beams.

In the distance information obtaining apparatus, the light beam scanning unit may scan the object with the plurality of diffractive light beams in direction of arraying the plurality of diffractive light beams.

In the distance information obtaining apparatus, the light beam scanning unit may scan the object with the plurality of diffractive light beams in perpendicular direction to arraying said plurality of diffractive light beams.

The reflected light detecting unit may be a capturing device operable to receive the reflected light from the object to capture an image of the object.

The distance information calculating unit may calculate the distance for at least one pixel of the image; and the information outputting unit may output a distribution of the distance.

The distance information calculating unit may calculate reflectivity from a maximum intensity of the reflected light at the point-of-interest and the distance, and the information outputting unit may output the reflectivity.

According to the second aspect of the present invention, a distance information obtaining method for obtaining a distance from a measurement-start point to an object, comprises: emitting a light beam; scanning the object with the light beam in such a manner that a center of scan is positioned on the measurement-start point; detecting reflected light from a point-of-interest on the object scanned with the light beam; calculating the distance from a scan velocity and a parameter related to an irradiation time of the object with the light beam; and outputting the calculated distance.

The parameter may be based on a time from start to end of irradiation of the object with the light beam.

A plurality of light beams may be emitted in the light beam emission step, the plurality of light beams including at least a first light beam and a second light beam and traveling in directions approximately parallel to each other. In this case, a time from detection of the reflected light of the first light beam to detection of the reflected light of the second light beam is calculated as the parameter in the distance calculation step.

The distance calculation step may include: calculating an integrated intensity of the reflected light at the point-of-interest; and calculating the distance by using a maximum intensity of the reflected light.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

(Embodiment 1)

Figure 1:
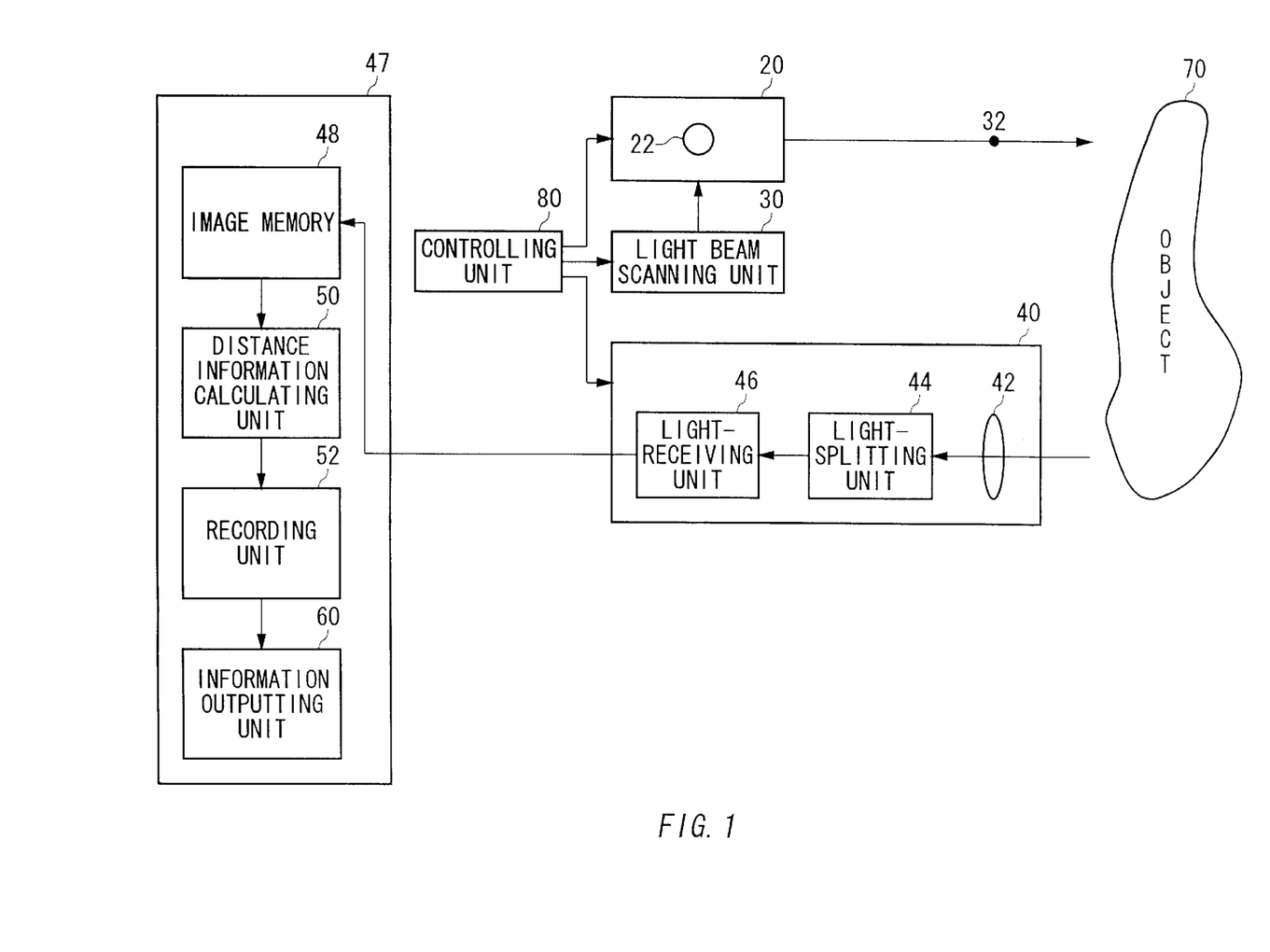
FIG. 1 is a block diagram schematically showing a structure of a distance information obtaining apparatus according to a first embodiment of the present invention.

The first embodiment of the present invention is described. FIG. 1 schematically shows an exemplary structure of a distance information obtaining apparatus 10 of the present embodiment. The distance information obtaining apparatus 10 includes a light beam emitting unit 20, a light beam scanning unit 30, a reflected light detecting unit 40, a processing unit 47 and a controlling unit 80.

The light beam emitting unit 20 emits at least one light beam. The light beam scanning unit 30 scans an object with the light beam emitted from the light beam emitting unit 20 in such a manner that a center of the scan is positioned on a measurement-start point 32. The reflected light detecting unit 40 detects light reflected from the object scanned with the light beam. The processing unit 47 processes data related to the reflected light from the object to calculate a distance from the measurement-start point 32 to each point-of-interest on the object. The processing unit 47 may calculate the reflectivity at the point-of-interest on the object at a wavelength of the light beam. The controlling unit 80 controls the emission of the light beam by the light beam emitting unit 20, the scan with the light beam by the light beam scanning unit 30, and the like.

Figure 2:
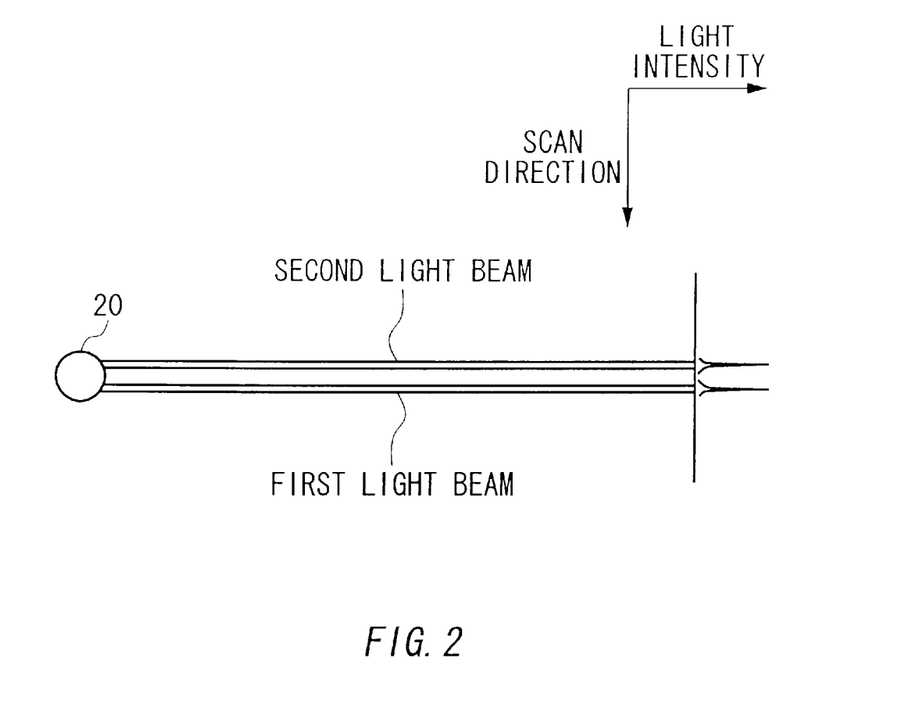
FIG. 2 shows exemplary emission of light by a light beam emitting unit of the distance information obtaining apparatus according to the first embodiment of the present invention.

The light beam emitting unit 20 has at least one light source 22. The light source 22 emits a light beam having a predetermined cross-sectional intensity distribution. For example, the light beam emitting unit 20 emits two light beams that travel substantially in parallel direction with each other, shown in FIG. 2. In this case, each of the two light beams has a peak of the intensity in a direction perpendicular to the scan direction. As the light source 22, a laser device can be used, for example. Please note that the light beam emitted from the light beam emitting unit 20 is not limited to invisible light. The light beam may be ultraviolet light or near infrared light.

The light beam scanning unit 30 scans the object with the light beam emitted from the light beam emitting unit 20 in such a manner that the center of the scan is positioned on the measurement-start point 32. The light beam scanning unit 30 is, for example, a rotation mechanism that can rotate the light beam emitting unit 20 around the measurement-start point 32 as the rotation center. Alternatively, the light beam scanning unit 30 may include a mirror for reflecting the light beam from the fixed light emitting unit 20 toward the object and a rotation mechanism that can rotate the light beam around the measurement-start point 32 as the rotation center while the measurement-start point 32 is determined to be a point on the mirror where the light is incident onto the mirror. More specifically, the light beam scanning unit 30 allows the scan with the light beam by including a polygon mirror or a galvano-mirror. The light beam scanning unit 30 scans with the light beam a plane perpendicular to a straight line passing through the measurement-start point 32 and a particular point-of-interest on the object at an approximately constant velocity. The light beam scanning unit 30 may perform the scan at a constant angular velocity in such a manner that the center of the scan is positioned on the measurement-start point 32.

The reflected light detecting unit 40 includes an optical lens 42 as an example of an optical image-forming unit, a light-splitting unit 44, and a light-receiving unit 46. The lens 42 converges the reflected light from the object 70. The light-splitting unit 44 splits the reflected light from the object 70 by wavelength separation in accordance with the wavelength characteristics of the light beam emitted from the light beam emitting unit 20. The light-receiving unit 46 receives the reflected light after being split.

The light-receiving unit 46 is an optical sensor, for example. The optical sensor can detect the temporal change of the intensity of the reflected light at the point-of-interest on the object.

The reflected light detecting unit 40 may be provided on an optical axis of the light beam emitted from the light beam emitting unit 20. In this case, it is possible to eliminate correction for an angle of reflection from the object, thus simplifying an operation to be performed for the intensity of the reflected light from the object.

Moreover, the reflected light detecting unit 40 may include a plurality of light-receiving units 46. In this case, even if one of the light-receiving units 46 cannot detect the reflected light from a particular point-of-interest because of an obstacle, the remaining light-receiving unit(s) 46 can detect the reflected light from the particular point-of-interest as long as the remaining light-receiving unit(s) is/are provided in such a manner there is no obstacle on the optical path(s) from the particular point-of-interest on the object.

Figure 3:
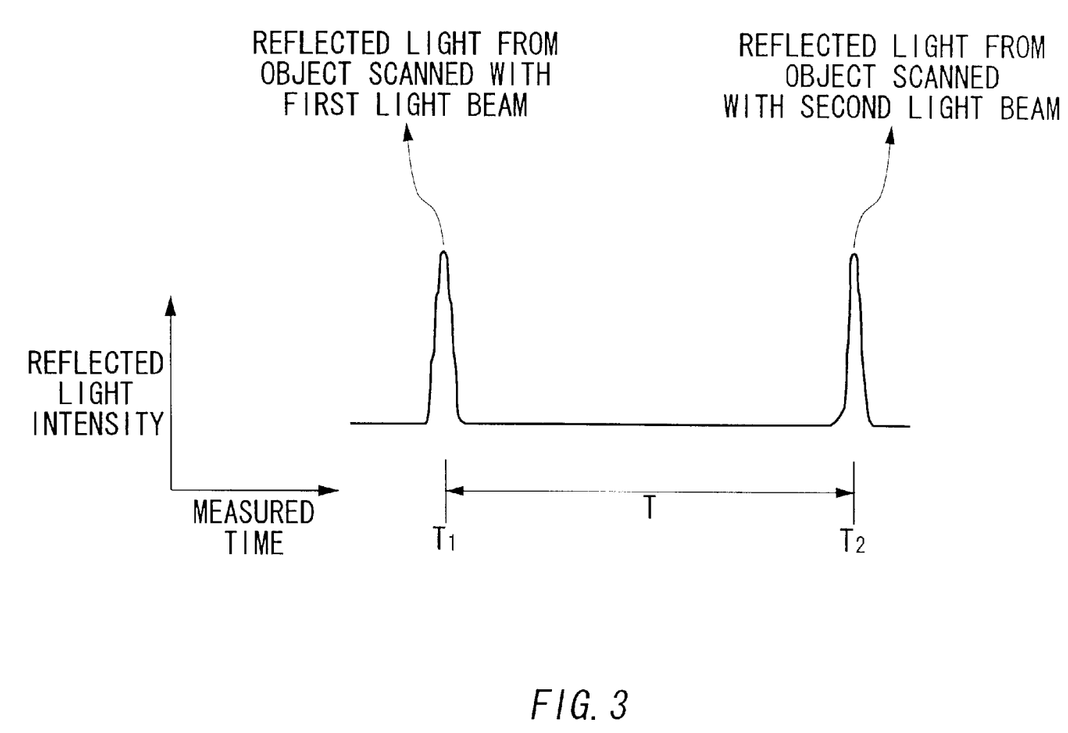
FIG. 3 shows a temporal change of the intensity of reflected light at a point-of-interest.

The processing unit 47 includes an image memory 48, a distance information calculating unit 50, a recording unit 52, and an information outputting unit 60. The image memory 48 stores the temporal change of the intensity of the reflected light at each point-of-interest detected by the reflected light detecting unit 40. An exemplary temporal change of the intensity of the reflected light is shown in FIG. 3. FIG. 3 is a graph showing the temporal change of the intensity of the reflected light at a particular point-of-interest. In this case, the object is irradiated with approximately parallel two light beams (shown in FIG. 2). At time T1, a peak of the reflected light of the first light beam is detected. After the time T1, a peak of the reflected light of the second light beam is detected at time T2. The time difference between the times T1 and T2 is T.

The distance information calculating unit 50 calculates a distance from the measurement-start point 32 to the point-of-interest on the object 70 based on the temporal change of the intensity of the reflected light stored in the image memory 48 for each point-of-interest and the maximum intensity of the reflected light. The point-of-interests correspond to pixels of an image of the object that the reflected light detecting unit captures by receiving the reflected light in the present embodiment The recording unit 52 records a distribution of the distance from the measurement-start point 32 to each pixel calculated by the distance information calculating unit 50. The distance information calculating unit 50 also calculates the reflectivity at the wavelength of the light beam for each point-of-interest. The reflectivity can be calculated from the maximum intensity of the reflected light at the point-of-interest and the calculated distance. The reflectivity calculated by the distance information calculating unit 50 is recorded for each pixel by the recording unit 52. In the present embodiment, the recording unit 52 records information regarding the distance from the measurement-start point 32 to each pixel or information of the reflectivity at each pixel onto a semiconductor memory, such as a flash memory or a memory card. The information outputting unit 60 outputs the information of the distance from the measurement-start point 32 to each pixel or the information of the reflectivity at each pixel that was recorded in the recording unit 52.

In a case where the plurality of light-receiving units 46 are provided in the reflected light detecting unit 40, the distance information calculating unit 50 may calculate the distances to a particular point-of-interest based on the temporal changes of the reflected-light intensities respectively detected by the light-receiving units 46 for the particular point-of-interest. A value obtained by averaging the distances may be used as the finally obtained distance for the particular point-of-interest to be stored as the distance information. By detecting the reflected light by means of the plurality of light-receiving units 46, reliability of the calculated data can be improved.

The controlling unit 80 controls the intensity of the light beam emitted from the light beam emitting unit 20, a timing of the light emission, and the scan speed of the light beam scanning unit 30. The controlling unit 80 may adjust a focus, an opening size of a diaphragm, an exposure time period, and the like, of the reflected light detecting unit 40.

Next, the principle of the calculation of the distance by the distance information calculating unit 50 is described.

Figure 4:
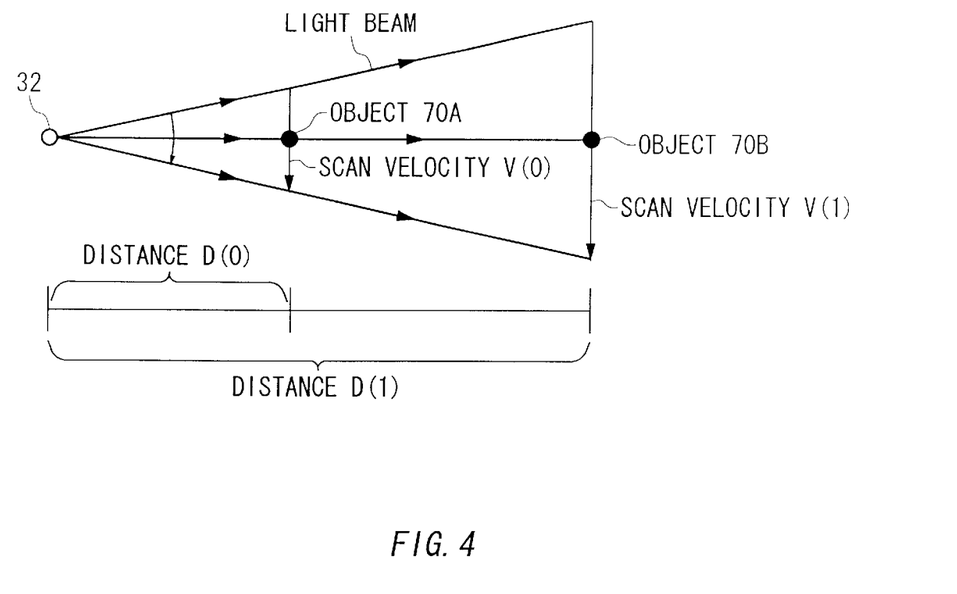
FIG. 4 is a diagram for explaining the principle of distance calculation according to the first embodiment of the present embodiment.

FIG. 4 is a diagram for explaining the principle of the distance calculation according to the present embodiment.

The object 70A is positioned at a point away from the measurement-start point 32 by a distance D(0). The object 70B is positioned on a straight line connecting the measurement-start point 32 and the object 70A at a point away from the measurement-start point 32 by a distance D(1). The light beam is emitted from the measurement-start point 32 in such a manner that the objects 70A and 70B are scanned with the emitted light beam.

It is assumed that a plane perpendicular to the straight line connecting the measurement-start point 32 and the object 70A is scanned with the light beam at a constant velocity V(0). Then, the scan velocity V(1) at which a plane perpendicular to a straight line connecting the measurement-start point 32 and the object 70B is scanned with the light beam is obtained by the following expression.

$$V(1)=V(0) \times D(1)/D(0)=K \times D(1) \qquad (1)$$

where $$K=V(0)/D(0)$$

K is a constant determined when the scanning velocity at the point away from the measurement-start point 32 by the distance D(0) is set to V(0).

Thus, the scanning velocity V(1) on the object 70B is in direct proportion to the distance D(1) from the measurement-start point 32 to the object 70B.

Then, a case is considered where two light beams that travel in approximately parallel directions are radiated onto the object. It is assumed that an interval between the first and second light beams is L, and these light beams are directed to the object in accordance with the above-described scanning conditions. At a certain point-of-interest on the object, the intensity of the light beam with which the object is irradiated is changed with the scan of the light beam. The intensity change of the light beam is determined by the cross-sectional intensity distribution of the light beam, the interval L between the first and second light beams and the scanning velocity of the light beam.

At the certain point-of-interest, a time lag T is generated between a time at which the point-of-interest is irradiated with the first light beam and a time at which the point-of-interest is irradiated with the second light beam. This time lag T is determined by the interval L between the first and second light beams and the scanning velocity of the light beam.

This relationship is expressed as follows.

$$T=L/V(1)$$

By using Expression (1), T is expressed as follows.

$$T=L/(K \times D(1))$$

Thus, the following expression is obtained.

$$D(1)=L/(K \times T)$$

In this expression, the constants K and L can be determined in advance. Thus, with the measurement of the time lag T, the distance D(1) to the object can be calculated.

The time lag T can be obtained by measuring the reflected light from the object irradiated with the light beam. That is, the time lag T is one example of a parameter recited in the appended claims, and is obtained as the time difference between the times T1 and T2 shown in FIG. 3.

Figure 5:
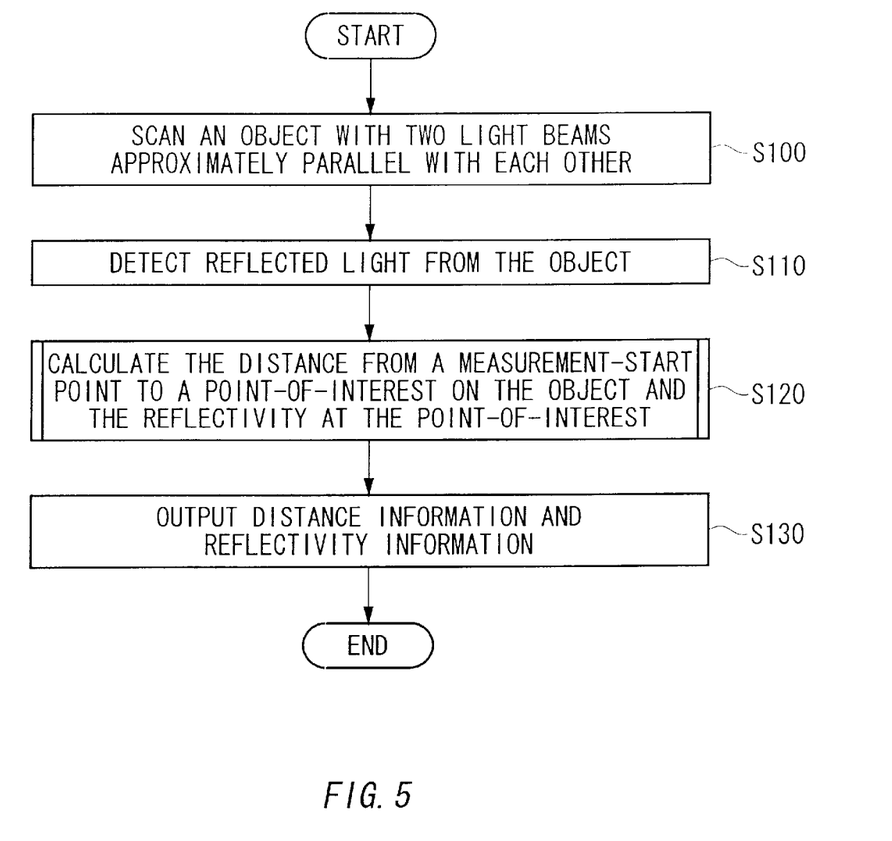
FIG. 5 is a flowchart of a distance information obtaining method according to the first embodiment of the present invention.

FIG. 5 is a flowchart of a distance information obtaining method according to the present embodiment. The light beam emitting unit 20 emits two light beams approximately parallel to each other. The light beam scanning unit 30 scans the object with the emitted light beams in such a manner that the center of the scan is positioned on the measurement-start point (Step S100). The reflected light detecting unit 40 detects the reflected light from the object which is being scanned with the light beam. The temporal change of the intensity of the detected reflected light is recorded for each point-of-interest on the object (Step S110). The distance information calculating unit 50 calculates the distance from the measurement-start point to the point-of-interest on the object and the reflectivity at the point-of-interest on the object (Step S120). The information outputting unit 60 outputs the distance and reflectivity thus calculated to a monitor screen or paper by means of a printer (Step S130).

Figure 6:
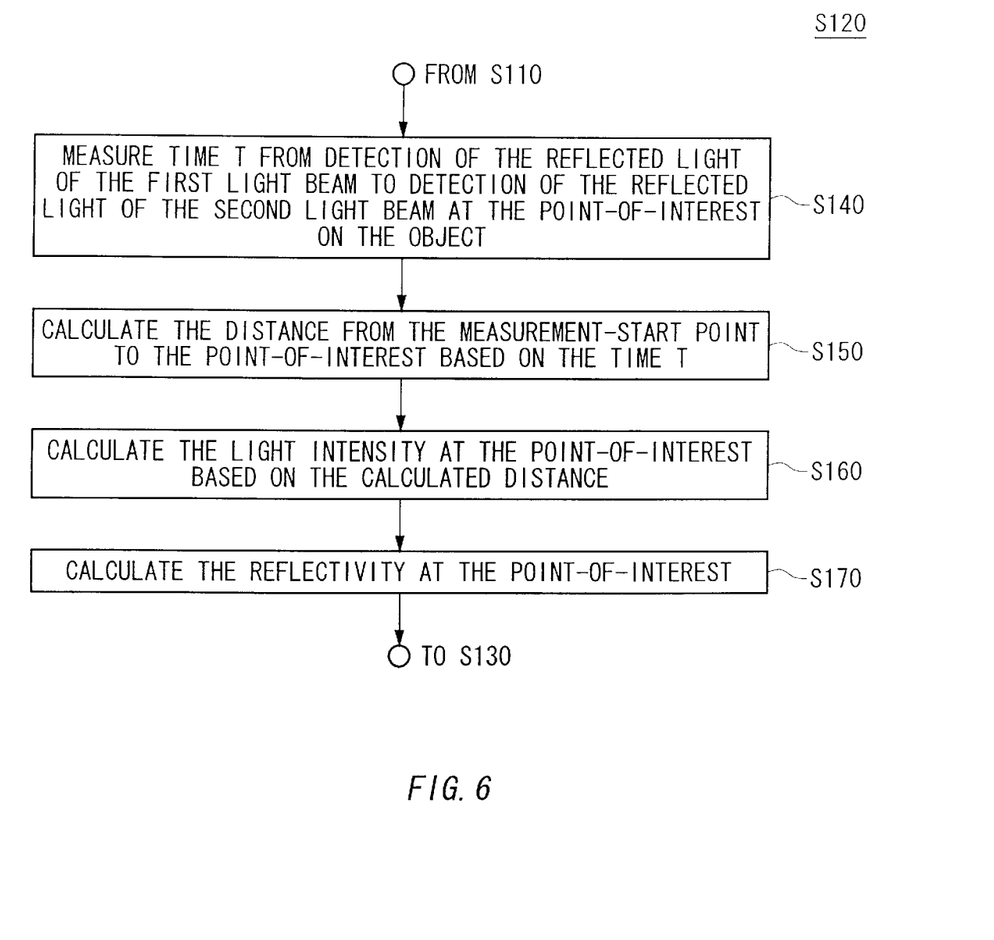
FIG. 6 is a flowchart of distance calculation in Step S120 in the flowchart shown in FIG. 5 according to the first embodiment of the present invention.

FIG. 6 is a flowchart of the distance calculation in S120. For the point-of-interest on the object, the time T from the time at which the reflected light of the first light beam is detected to the time at which the reflected light of the second light beam is detected is measured (Step S140). Based on the measured time T, the distance from the measurement-start point to the point-of-interest on the object is calculated (Step S150). Based on the calculated distance, the intensity of the light beam at the point-of-interest is calculated by using damping characteristics of either light beam (Step S160). Then, the reflectivity is calculated from the intensity of the reflected light at the point-of-interest of the irradiated light beam (Step S170).

(Embodiment 2)

The second embodiment of the present invention is described. The structure of the distance information obtaining apparatus 10 of the present embodiment can be shown in the same manner as FIG. 1, and therefore a block diagram and detailed description for the distance information obtaining apparatus 10 of the present embodiment are omitted.

Figure 7:
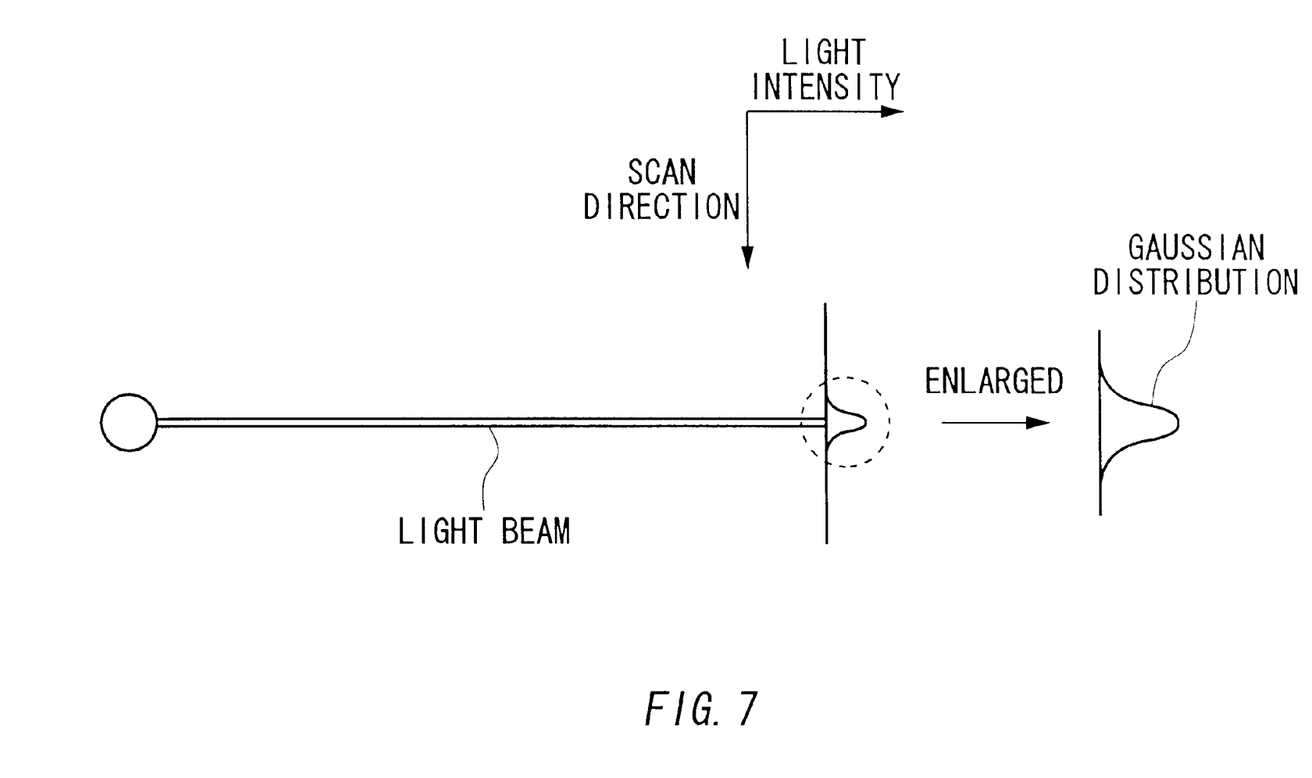
FIG. 7 shows exemplary emission of light by a light beam emitting unit of the distance information obtaining apparatus according to the second embodiment of the present invention.

In the present embodiment, the light beam emitting unit 20 has at least one light source 22. The light source 22 emits a light beam having a predetermined cross-sectional intensity distribution. For example, the light source 22 emits the light beam having the intensity that has a Gaussian distribution in a cross-sectional plane perpendicular to the scan direction (FIG. 7). As the light source 22, a laser device can be used, for example. The light source may emit ultraviolet light or near infrared light other than visible light.

In an example, the light-receiving unit 46 is a solid-state imaging sensor. An image of the object 70 is formed on a light-receiving surface of the solid-state imaging sensor. Electric charges are stored in respective sensor elements of the solid-state imaging sensor in accordance with the light amount of the formed image of the object 70. The stored electric charges are scanned in a predetermined order to be read as an electric signal.

The solid-stage imaging sensor is desirably a charge-coupled device (CCD) imaging sensor having an excellent S/N ratio and a large number of pixels in order to detect the intensity of the reflected light from the object 70 for each pixel with high precision. Other than the CCD imaging sensor, any of a MOS imaging sensor, a CdS-Se direct-contact type imaging sensor, a-Si (amorphous silicon) direct-contact type imaging sensor and a bipolar direct-contact type imaging sensor may be used as the solid-state imaging sensor.

Figure 8:
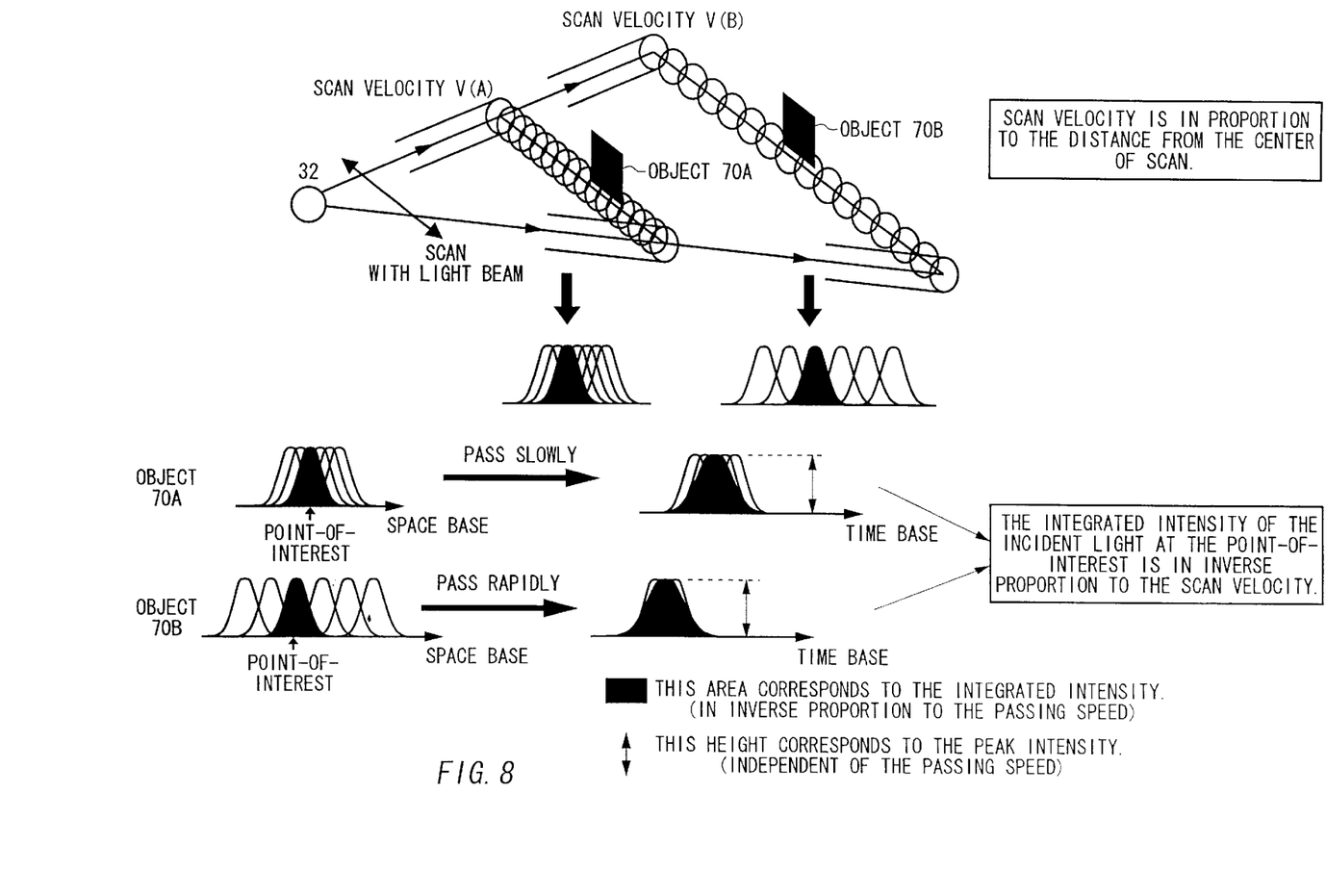
FIG. 8 is a diagram for explaining the principle of distance calculation according to the second embodiment of the present invention.

Next, the principle of distance calculation by the distance information obtaining unit 50 according to the present embodiment is described. FIG. 8 is a diagram for explaining the principle of the distance calculation according to the present embodiment.

A distance between the measurement-start point 32 and the object 70A is D(A). The object 70B is positioned on the straight line connecting the measurement-start point 32 and the object 70A at a point away from the measurement-start point by a distance D(B).

It is assumed that a plane perpendicular to the straight line connecting the measurement-start point 32 and the object 70A is scanned with the light beam at a constant velocity V(A). In this case, a scan velocity V(B) of the scan with the light beam on a plane perpendicular to a straight line connecting the measurement-start point and the object 70B is obtained by the following expression.

$$V(B)=V(A)\times D(B)/D(A)=K\times D(B) \tag{2}$$

where $$K=V(A)/D(A)$$

K is a constant determined when the scan velocity at the point away from the measurement-start point 32 by the distance D(A) is set to V(A).

Thus, the scan velocity V(B) on the object 70B is in direct proportion to the distance D(B) from the measurement-start point to the object 70B.

Here, it is assumed that a width of the point-of-interest on the object 70B in the scan direction is M. Then, a time required for scanning the point-of-interest on the object 70B is M/V(B).

The intensity Y of the light beam at a position away from the measurement-start point by the distance D(B) is obtained by considering the damping ratio of the light G(D(B)) that depends on the distance from the measurement-start point as follows.

$$Y=G(D(B))\times G(0)$$

In this expression, G(0) is the intensity of the light beam at the measurement-start point.

Thus, the integrated intensity S(B) of the light beam with which the object 70B is irradiated during the scan of the object 70B with the light beam is expressed as follows.

$$S(B)=M/V(B)\times Y=M\times G(D(B))\times G(0)/V(B)$$

On the other hand, the maximum intensity P(B) of the light beam with which the object 70B is irradiated is expressed by using a constant C as follows.

$$P(B)=C\times G(D(B))\times G(0)$$

Thus, a ratio of the integrated intensity to the maximum intensity of the light beam with which the object 70B is irradiated is obtained as follows.

$$S(B)/P(B)=M/(V(B)\times C)=M/(K\times C\times D(B))$$

This expression is transformed into $$D(B)=(M\times P(B))(K\times C\times S(B))$$

The unit of S(B)/P(B) is time and therefore corresponds to an example of the parameter recited in the appended claims.

Accordingly, when the width M in the scan direction and the constants K and C have been obtained by in advance, the distance D(B) from the measurement-start point to the object can be calculated by measuring S(B)/P(B), even if the light beam declines.

Figure 9:
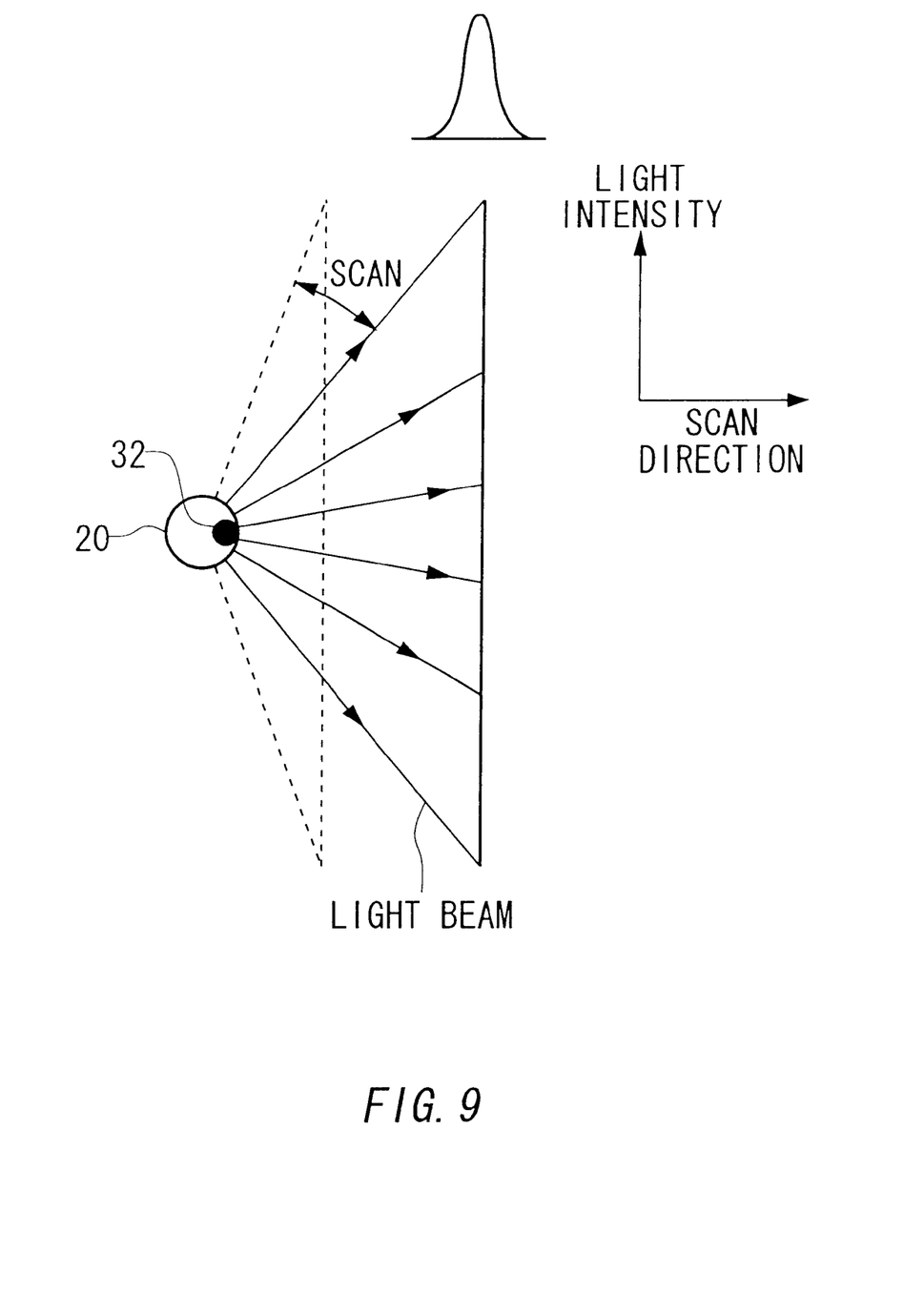
FIG. 9 shows a modification of the emission of the light by the light emitting unit of the distance information obtaining apparatus.

FIG. 9 shows an exemplary modification of the emission of the light beam by the light beam emitting unit 20. The light beam emitting unit 20 emits a fan-like light beam which diverges to form a fan-like shape and has a predetermined intensity distribution in a cross section thereof. The light beam scanning unit 30 performs the scan with the fan-like light beam in a direction perpendicular to the plane on which the light beam diverges. The reflected light detecting unit 40 detects the reflected light from a region which is scanned. The distance information calculating unit 50 calculates distances at the respective points-of-interest within the scanned region by using the aforementioned principle. According to this modification, the time period from the scan with the light beam to finish of the calculation of the distances of the respective points-of-interest can be greatly shortened, since the wider region can be irradiated with the light beam by only one scan.

Figure 10:
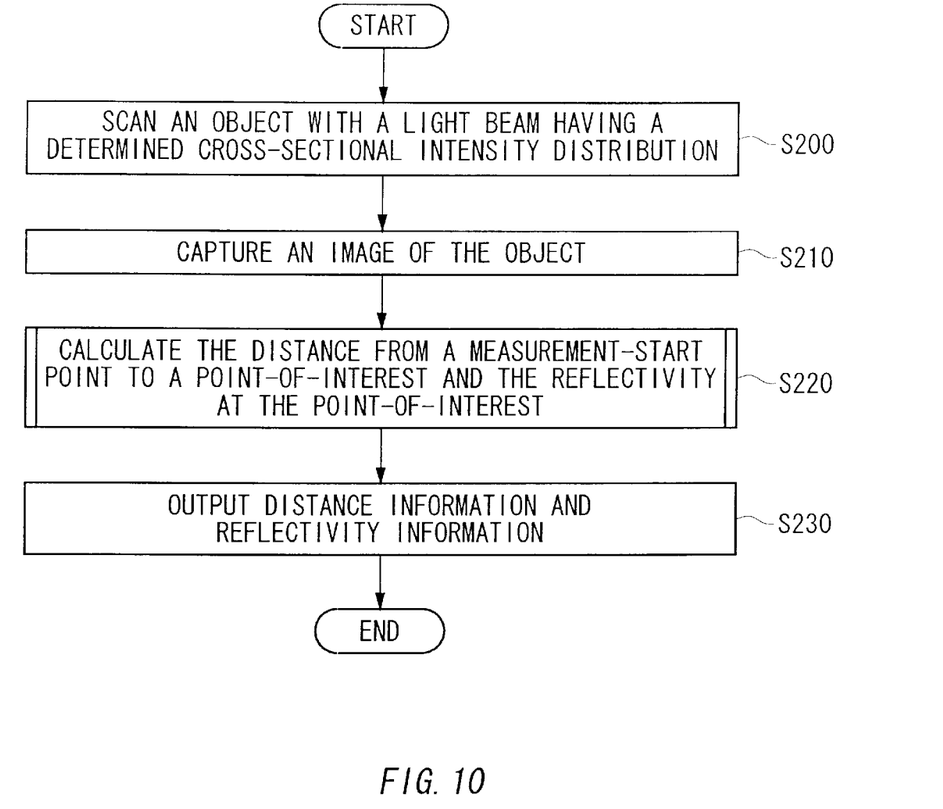
FIG. 10 is a flowchart of a distance information obtaining method according to the second embodiment of the present invention.

FIG. 10 is a flowchart of the distance information obtaining method according to the present embodiment. The light beam emitting unit 20 emits the light beam having a predetermined cross-sectional intensity distribution. The light beam scanning unit 30 scans the object with the emitted light beam in such a manner that the center of the scan is positioned at the measurement-start point (Step S200). The reflected light detecting unit 40 captures an image of the object by receiving the reflected light from the object scanned with the light beam. Then, information regarding the integrated intensity of the reflected light and information regarding the maximum intensity of the reflected light are stored for each pixel of the image (Step S210). The distance information calculating unit 50 calculates the distance from the measurement-start point for each pixel from the integrated intensity and the maximum intensity of the reflected light and the reflectivity at each pixel (Step S220). The information outputting unit 60 outputs the distance and the reflectivity thus calculated to a monitor screen, paper by means of a printer, or the like (Step S230).

Figure 11:
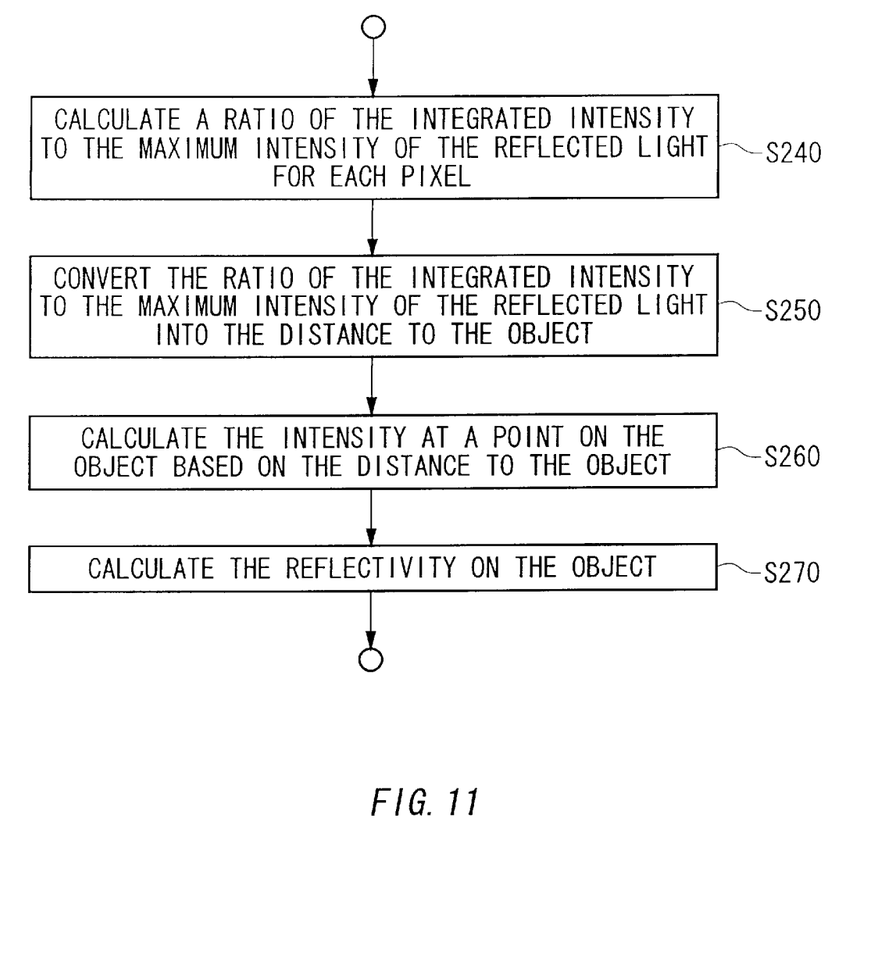
FIG. 11 is a flowchart of the distance calculation in Step S220 in the flowchart shown in FIG. 10 according to the second embodiment of the present invention.

FIG. 11 is a flowchart of the distance information calculation in Step S220. For each pixel, a ratio of the integrated intensity of the reflected light to the maximum intensity thereof is calculated (Step S240). By multiplying the obtained ratio by a predetermined coefficient, the distance from the measurement-start point is obtained (Step S250). Based on the thus calculated distance, the intensity of the light beam at the point-of-interest is calculated by using the damping characteristics of the light beam (Step S260). Finally, the reflectivity is calculated from the intensity of the reflected light at each pixel and the intensity of the incident light beam at each pixel (Step S270).

Figure 12:
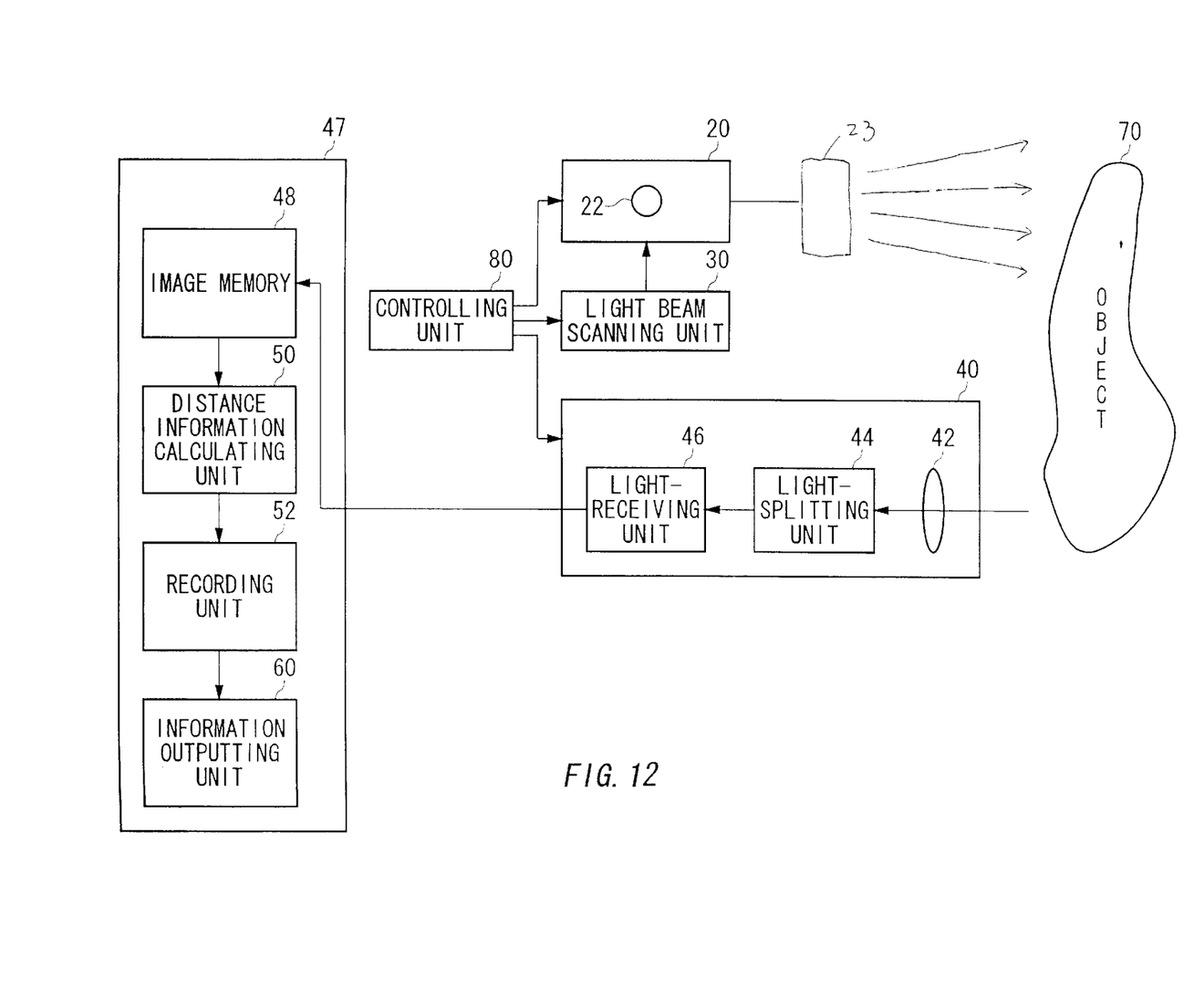
FIG. 12 is a block diagram schematically showing a structure of a distance information obtaining apparatus according to a third embodiment of the present invention.

FIG. 12 schematically shows an exemplary structure of a distance information obtaining apparatus 12 according to the third embodiment. In the distance information obtaining apparatus 12 shown in FIG. 12, elements or structure corresponding to the first embodiment shown in FIG. 1 are referred by the same numerals. Explanations for such corresponding elements and structures are omitted here.

The distance information obtaining apparatus 12 has an diffraction grating 23 which diffracts an beam emitting from a light beam emitting unit 20 into plural light beams, being different from the first embodiment. As shown in FIG. 12, the diffraction grating 23 of the distance information obtaining apparatus 12 diffracts the light beam into four (4) light beams. However, it is not limited. The designated number of diffractive light beams may be obtained by designing a suitable diffraction grating.

When the distance of the object are obtained, the distance obtaining apparatus 12 irradiates the plural light beams on plural points-of-interest of the object 70 at one time. Thus, for obtaining the distance, if the diffractive light beams are scanned in the direction of the beams' array, that is in the up-and-down direction in FIG. 12, a scanning angle reduces to one of four (¼). Alternately, the diffractive light beams are scanned in the direction being perpendicular to the beam's array, that is in the rear-and-back direction of paper, information with four scanning lines are obtained in one scanning.

According to the distance obtaining apparatus of the third embodiment, the similar effects with the first embodiment may be achieved. Furthermore, the distance obtaining apparatus of the third embodiment uses the plural diffractive light means for scanning, and therefore the scanning time may be reduced.

As is apparent from the above description, according to the present invention, a distance information obtaining apparatus having a compact and simple structure and a distance information obtaining method can be provided.

Although the present invention has been described by way of exemplary embodiments, it should be understood that those skilled in the art might make many changes and substitutions without departing from the spirit and the scope of the present invention which is defined only by the appended claims.

What is claimed is:

1. A distance information obtaining apparatus for obtaining information of a distance from a measurement-start point to an object, comprising:
   a light beam emitting unit operable to emit a light beam;
   a light beam scanning unit operable to scan said object with said light beam in such a manner that a center of scan is positioned on said measurement-start point;
   a reflected light detecting unit operable to detect reflected light from a point-of-interest on said object scanned with said light beam;
   a distance information calculating unit operable to calculate said distance from a scan velocity and a parameter relating to an irradiation time of said object; and
   an information outputting unit operable to output said calculated distance.

2. A distance information obtaining apparatus as claimed in claim 1, wherein said parameter is based on a time from start to end of irradiation of said object with said light beam.

3. A distance information obtaining apparatus as claimed in claim 1, wherein said light emitting unit emits a plurality of light beams including at least a first light beam and a second light beam, said plurality of light beams traveling in directions approximately parallel to each other, and
   said distance information calculating unit calculates, as said parameter, a time from detection of said reflected light of said first light beam to detection of said reflected light of said second light beam.

4. A distance information obtaining apparatus as claimed in claim 1, wherein said distance information obtaining unit calculates an integrated intensity of said reflected light at said point-of-interest as said parameter, and calculates said distance by using said integrated intensity thus calculated and a maximum intensity of said reflected light.

5. A distance information obtaining apparatus as claimed in claim 1, wherein said light beam emitting unit emits a fan-like light beam which diverges in a direction perpendicular to a scan direction, said fan-like light beam having a predetermined cross-sectional intensity distribution in said scan direction,
   said reflected light detecting unit detects said reflected light from a region on said object, said region being scanned with said fan-like light beam, and
   said distance information calculating unit calculates said distance at said point-of-interest within said region.

6. A distance information obtaining apparatus as claimed in claim 4, wherein said light beam emitted by said light beam emitting unit has a cross-sectional intensity distribution that is Gaussian distribution, and
   said distance information calculating unit calculates said integrated intensity and said maximum intensity of said reflected light at said point-of-interest based on an integrated intensity and a maximum intensity of said light beam with which said point-of-interest is irradiated.

7. A distance information obtaining apparatus as claimed in claim 5, wherein said light beam emitted by said light beam emitting unit has a cross-sectional intensity distribution that is Gaussian distribution, and
   said distance information calculating unit calculates said integrated intensity and said maximum intensity of said reflected light at said point-of-interest based on an integrated intensity and a maximum intensity of said light beam with which said point-of-interest is irradiated.

8. A distance information obtaining apparatus as claimed in claim 1, wherein said light beam scanning unit scans a plane perpendicular to a straight line passing through said measurement-start point and said point-of-interest at an approximately constant velocity.

9. A distance information obtaining apparatus as claimed in claim 1, wherein said reflected light detecting unit is provided on an optical axis of said light beam.

10. A distance information obtaining apparatus as claimed in claim 1, wherein said reflected light unit includes a plurality of optical sensors operable to detect said reflected light from a plurality of points-of-interest, and
    said distance information obtaining unit calculates, for each of said points-of-interest, said parameter for said reflected light detected by each of said plurality of optical sensors, and calculates said distance based on said parameter.

11. A distance information obtaining apparatus as claimed in claim 10, further comprising a diffractive grating which diffracts the light beam emitting from said light beam emitting unit into a plurality of diffractive light beams.

12. A distance information obtaining apparatus as claimed in claim 11, wherein said light beam scanning unit scans said object with said plurality of diffractive light beams in direction of arraying said plurality of diffractive light beams.

13. A distance information obtaining apparatus as claimed in claim 11, wherein said light beam scanning unit scans said object with said plurality of diffractive light beams in perpendicular direction to arraying said plurality of diffractive light beams.

14. A distance information obtaining apparatus as claimed in claim 4, wherein said reflected light detecting unit is a capturing device operable to receive said reflected light from said object to capture an image of said object.

15. A distance information obtaining apparatus as claimed in claim 14, wherein said distance information calculating unit calculates said distance for at least one pixel of said image, and
    said information outputting unit outputs a distribution of said distance.

16. A distance information obtaining apparatus as claimed in claim 1, wherein said distance information calculating unit calculates reflectivity from a maximum intensity of said reflected light at said point-of-interest and said distance, and
    said information outputting unit outputs said reflectivity.

17. A distance information obtaining method for obtaining a distance from a measurement-start point to an object, comprising:

emitting a light beam;

scanning said object with said light beam in such a manner that a center of scan is positioned on said measurement-start point;

detecting reflected light from a point-of-interest on said object scanned with said light beam;

calculating said distance from a scan velocity and a parameter related to an irradiation time of said object with said light beam; and     outputting said calculated distance.

18. A distance information obtaining method as claimed in claim 17, wherein said parameter is based on a time from start to end of irradiation of said object with said light beam.

19. A distance information obtaining method as claimed in claim 17, wherein a plurality of light beams are emitted in said light beam emission step, said plurality of light beams including at least a first light beam and a second light beam and traveling in directions approximately parallel to each other, and     a time from detection of said reflected light of said first light beam to detection of said reflected light of said second light beam is calculated as said parameter in said distance calculation step.

20. A distance information obtaining method as claimed in claim 17, wherein said distance calculation step includes: calculating an integrated intensity of said reflected light at said point-of-interest; and calculating said distance by using a maximum intensity of said reflected light.

* * * * *